(12) United States Patent
Xu et al.

(10) Patent No.: US 12,052,312 B2
(45) Date of Patent: Jul. 30, 2024

(54) SECURE INTEGRATION BETWEEN AN EXTERNAL TELEPHONY SYSTEM AND A CUSTOMER RELATIONSHIP MANAGEMENT (CRM) SYSTEM

(71) Applicant: Salesforce, Inc., San Francisco, CA (US)

(72) Inventors: Ruifeng Xu, San Mateo, CA (US); Aizaz Ali Hakro, Daly City, CA (US); David Louvton, Tenafly, NJ (US); Vivek Tikoo, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/709,933

(22) Filed: Mar. 31, 2022

(65) Prior Publication Data
US 2022/0321642 A1    Oct. 6, 2022

Related U.S. Application Data

(60) Provisional application No. 63/200,925, filed on Apr. 2, 2021.

(51) Int. Cl.
*H04L 67/10* (2022.01)
*G06F 3/0481* (2022.01)

(52) U.S. Cl.
CPC ............ *H04L 67/10* (2013.01); *G06F 3/0481* (2013.01)

(58) Field of Classification Search
CPC ..... H04L 67/00; H04L 67/10; H04L 65/1063; H04L 65/00; H04L 41/5064; H04L 41/5087; H04L 41/5096; G06F 3/0481

USPC ........................................................ 709/217
See application file for complete search history.

(56) References Cited

U.S. PATENT DOCUMENTS

| | | | | |
|---|---|---|---|---|
| 2006/0133349 | A1* | 6/2006 | Kan | H04M 3/5191 370/352 |
| 2010/0246800 | A1* | 9/2010 | Geppert | H04L 12/1822 379/265.09 |
| 2012/0047517 | A1* | 2/2012 | Townsend | H04M 3/5191 709/227 |
| 2012/0198067 | A1* | 8/2012 | Weiss | G06Q 10/00 709/226 |

(Continued)

*Primary Examiner* — Suraj M Joshi
*Assistant Examiner* — Ayele F Woldemariam
(74) *Attorney, Agent, or Firm* — Holland & Hart LLP

(57) ABSTRACT

Methods, systems, apparatuses, devices, and computer program products are described. In some systems, a component (e.g., software component, hardware component, or a combination thereof) may support integration between a customer relationship management (CRM) system and a telephony system. A processing device—such as a server—hosting the component (e.g., hosted in the CRM system) may load an inline frame supporting a connector to the telephony system within the component and may embed a service within the component. The embedded service may support calls to one or more messaging functions defined for a bridge component between the CRM and telephony systems. The inline frame and the embedded service may communicate messages via an unexposed message channel to support secure messaging. The embedded service may call one or more functions (e.g., a publish function, a handle message function) of the bridge component, for example, based on the messaging.

19 Claims, 9 Drawing Sheets

(56) References Cited

U.S. PATENT DOCUMENTS

| | | | | |
|---|---|---|---|---|
| 2013/0202098 A1* | 8/2013 | Vasudev | ............. | H04M 7/0033 |
| | | | | 379/265.09 |
| 2013/0244632 A1* | 9/2013 | Spence | ............... | H04M 3/5183 |
| | | | | 455/415 |
| 2014/0156681 A1* | 6/2014 | Lee | ..................... | G06F 16/9535 |
| | | | | 707/754 |

* cited by examiner

US 12,052,312 B2

SECURE INTEGRATION BETWEEN AN EXTERNAL TELEPHONY SYSTEM AND A CUSTOMER RELATIONSHIP MANAGEMENT (CRM) SYSTEM

CROSS-REFERENCE

The present application for patent claims priority to U.S. Provisional Patent Application No. 63/200,925 by Xu et al., entitled "REALTIME SYSTEM AND METHODS FOR EXTERNAL TELEPHONY SYSTEM TO COMMUNICATE SECURELY WITH CUSTOMER RELATIONSHIP MANAGEMENT (CRM) SYSTEMS," filed Apr. 2, 2021, which is assigned to the assignee hereof and expressly incorporated by reference herein.

FIELD OF TECHNOLOGY

The present disclosure relates generally to database systems and data processing, and more specifically to secure integration between an external telephony system and a customer relationship management (CRM) system.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, a tenant (e.g., organization) of a CRM system may subscribe to an external system for handling some processes, such as voice call functionality. For example, the tenant may use one or more telephony providers for handling voice calls, among other messaging functions. However, because a CRM system and a telephony system are separate systems, a user (e.g., agent) interacting with both systems may experience inefficiencies. For example, the user may frequently switch back-and-forth between user interfaces for the different systems to answer customer questions and manage calls. Additionally or alternatively, information captured in one of the systems (e.g., CRM information from the CRM system, call information from the telephony system) may fail to be reflected in the other system, potentially leading to inconsistencies in records and incomplete information.

DETAILED DESCRIPTION

Figure 1:
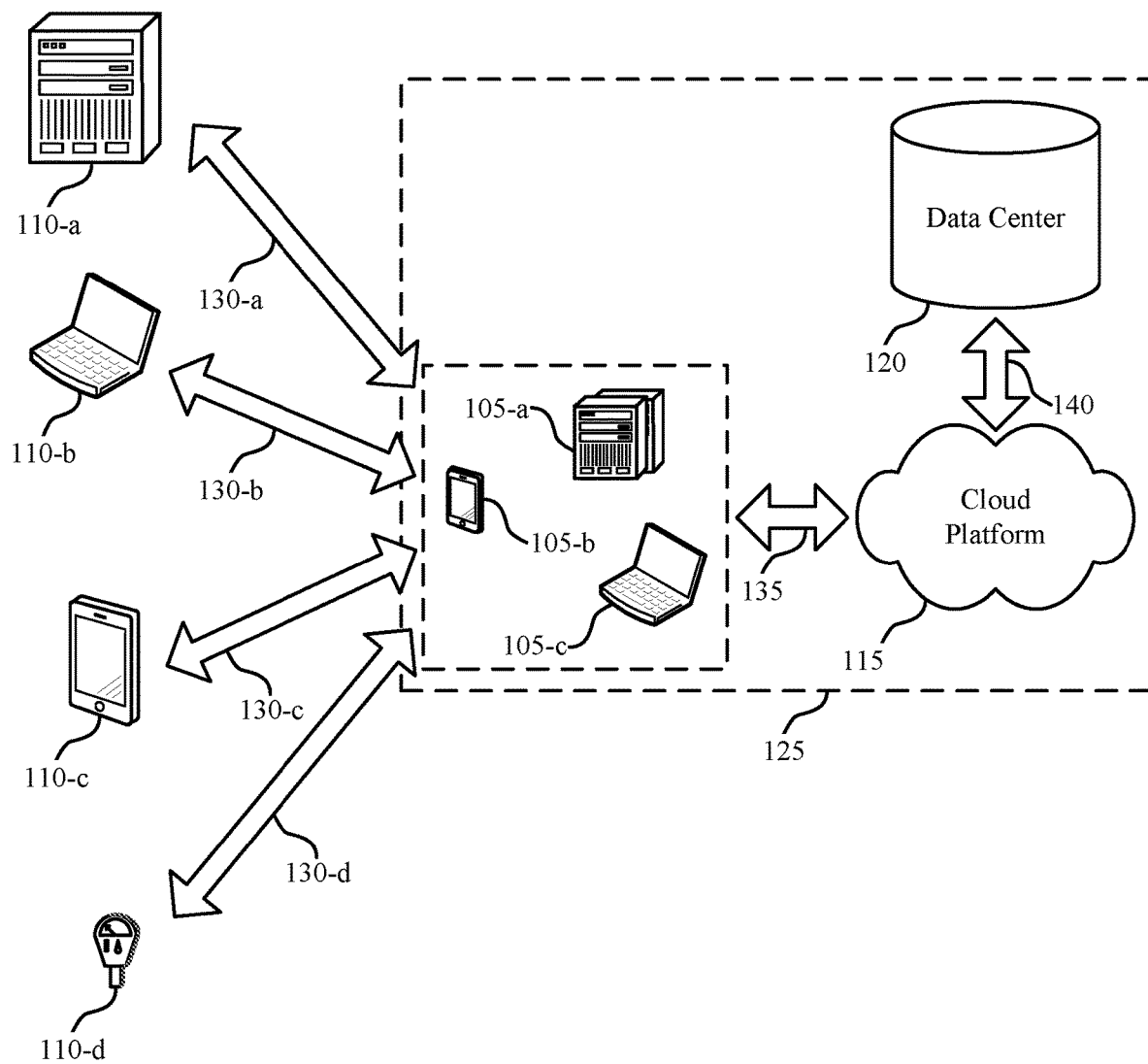
FIG. 1 illustrates an example of a system for cloud computing that supports secure integration between an external telephony system and a customer relationship management (CRM) system in accordance with aspects of the present disclosure.

Some systems, such as a multi-tenant database system supporting customer relationship management (CRM) solutions (e.g., a CRM system), may provide CRM functionality to multiple tenants (e.g., organizations, companies) subscribed to the system. However, a tenant may additionally utilize other systems external to the CRM system. For example, a tenant may provide customer support to a customer over one or more digital channels, such as via video, knowledge articles, discussion forums, artificial intelligence (AI)-powered chatbots, or some combination thereof. Additionally or alternatively, the tenant may have a service team to provide customer support via telephone, and customers may rely on these telephone customer support systems to access customer service. However, delivering intelligent, connected customer service that includes telephony service may present a number of challenges. For example, a tenant may use multiple telephony systems to run contact centers, and the telephony systems may not be fully integrated with one another or with the CRM system. As such, a customer service agent for the tenant may navigate multiple screens during interactions with customers (e.g., between a user interface for the CRM system and a user interface for a telephony system), which may increase wait times for customers. In addition, records of conversations with customers may not be maintained across systems, and as such records may be lost, inconsistent across systems, or otherwise fail to provide the proper context for future calls.

To improve integration between a CRM system and an external system (e.g., a telephony system), the CRM system may host a component that can unify telephony providers, digital channels, and CRM data in real-time (or pseudo-real-time) at a centralized processing device (e.g., server, server cluster). The component may offer intelligent, unified, and fast customer service to customers. For example, CRM information, telephone calls, and messaging may be integrated on a single platform such that customer service agents may work from a single application interface instead of toggling back and forth between multiple screens. In some examples, the component may leverage a connector (e.g., hosted in an inline frame (iframe)) for managing call events from a telephony system. Additionally, the component may instantiate a bridge component that supports one or more messaging functions for interacting with the telephony system. For example, the messaging functions may support publishing messages to a channel of the telephony system, handling messages received via the channel of the telephony system, or both. The component may include an embedded service that may send calls to or receive calls from the messaging functions of the bridge component. Additionally, the embedded service and the iframe may communicate information via a secure (e.g., unexposed) channel, such that the telephony system may trigger functions and events in the CRM system, and vice versa. As such, information from the CRM system may be automatically sent to the telephony service, and information from the telephony service may be automatically sent to the CRM system (e.g., for storage in data records). Such integration may maintain up-to-date telephony and CRM records that may be leveraged by customer service agents to improve customer service for an organization.

Aspects of the disclosure are initially described in the context of an environment supporting an on-demand database service. Additional aspects of the disclosure are described with respect to a system and process flow supporting integration between a telephony partner and a CRM system. Aspects of the disclosure are further illustrated by and described with reference to apparatus diagrams, system diagrams, and flowcharts that relate to secure integration between an external telephony system and a CRM system.

FIG. 1 illustrates an example of a system 100 for cloud computing that supports secure integration between an external telephony system and a CRM system in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, a cloud client 105 may be an example of a user device operated by an agent (e.g., a customer service agent) of an organization subscribed to the cloud platform 115. For example, the organization may be a tenant of a multi-tenant database system supporting CRM solutions. A contact 110 may be an example of a customer of the organization, which may contact the cloud client 105 via one or more digital channels, voice calls, or the like to request assistance or otherwise interact with a customer service agent. The organization may use one or more telephony systems for handling voice calls (e.g., in one or more call centers) between customers (e.g., contacts 110) and agents (e.g., cloud clients 105). A telephony system may be separate from—and external to—the subsystem 125 (e.g., a CRM system).

In some examples, customers (e.g., contacts 110) may connect with companies (e.g., tenants of a multi-tenant database system) across one or more digital channels when they have questions. For example, the customers can engage with a brand on a social media application; find videos, knowledge articles, discussion forums, or the like online; or both to solve problems themselves. In some cases, the customers may interact with AI-powered chatbots to receive automated answers relatively quickly. However, even with the emergence of these digital options, many companies still have service teams that provide customer support via telephone. Similarly, many customers still use the telephone systems as one method of accessing customer service. For example, some customers may use a telephony system (e.g., after first trying a different channel). As such, the telephony system is still an important communication tool, for example, in addition to other digital communication options.

In some other systems, delivering intelligent, connected service that includes telephone service may be difficult, in part because many companies use multiple telephone systems to run their contact centers. As such, the telephone service may not be fully integrated with a user device or application used by an agent (e.g., cloud client 105) of a company. This may cause the agent to navigate multiple screens, applications, systems, or some combination thereof during interactions with the customers. When the telephone system is not fully integrated with a CRM system, an agent may take notes which can be misplaced, or may otherwise fail to maintain accurate records across systems. Additionally or alternatively, histories of conversations with the customers may not be maintained and may be subjected to loss. As such, when the same customer calls for service multiple times, there may be little context recorded within a system to improve the customer experience. Even with AI capabilities that may be offered by some systems, the telephone service may not be supported by the AI capabilities.

In contrast, the system 100 may support an integration component (e.g., using a service cloud voice technology) to unify phone, digital channels, and CRM data in real-time (or pseudo-real-time) in a single platform (e.g., application). The integration component may support a contact center that can offer intelligent, unified, and relatively fast service to customers. Companies can use the integration component to integrate telephony operations and route calls on a single platform (e.g., within a CRM system) so that agents can work from a single application, eliminating the need to toggle back and forth from multiple screens and find manual workarounds between telephony systems and CRM systems. Companies can use the integration component to boost productivity by reducing data entry and call wrap-up time by automating the recordation of call data in the CRM system. With automatic transcription capabilities, agents may focus on the customers' needs quickly and accurately, as the data recordation may be efficiently automated. In some examples, companies may use the integration component to leverage AI-powered agent recommendations. For example, with call transcriptions surfacing in real-time (or pseudo-real-time) directly within the CRM system (e.g., during a live call via a telephony system), an AI-powered product may provide recommended solutions and next best actions for the agent in the background during the call, potentially reducing average call time and improving both the agent and customer experience. Additionally or alternatively, companies may use the integration component to empower supervisors with real-time (or pseudo-real-time) omni-channel visibility. A supervisor console (e.g., user interface in a CRM application) may provide a manager with a view into calls and digital conversations in real-time (or pseudo-real-time) for the manager's team, monitor where calls are being routed and what skills each agent has, and determine which conversations may benefit from the manager assisting or offering coaching live or after the call.

For example, when a customer calls in, omni-channel routing may direct the customer to a specific agent from a set of multiple available agents (e.g., based on previous interactions for the customer, based on the customer's specific questions). Additionally or alternatively, transcription capabilities support turning speech into text that can be viewed alongside customer data in an agent's console (e.g., the user interface for the agent's application). This may empower the agent to deliver a personalized experience based on factors like the customer's purchase history, warranty information, past interactions across channels, or any combination thereof. With the call converted to text, AI techniques may recommend responses, knowledge articles, next actions, or any combination thereof to the agent. The integration component may attach the call transcript to a customer record for the specific customer for future reference, analysis, or both. Such features may support an improved experience for both customer and agent by integrating features of the telephony systems with features of the CRM system.

In some examples, the integration component may support a "bring-your-own" telephony option that lets a company select a provider—or multiple providers—of their choosing, or the company may simply keep their existing telephony provider for transcription and other services. The telephony option associated with the integration component may be implemented using a toolkit application programming interface (API) which may provide for one-way broadcasting and insecure message channels, which may broadcast telephony events from an omni-widget.

The integration component may allow each telephony system (e.g., a telephony provider or service) to develop system-specific channels, components, integrations, or a combination thereof. The integration component may handle the different telephony system-specific designs using a universal set of features (e.g., an iframe, an embedded service). In some examples, an external telephony provider may develop a message channel (e.g., using the Salesforce Lightning Message Service or another service) for communication between an external telephony integration part and one or more applications, components, or both (e.g., associated with the CRM system, such as Salesforce Lightning Applications and Components). The message channel may be secured by the external telephony provider's namespace, which may grant the same namespace applications and components use of the message channel and may restrict applications and components of other namespaces from using the message channel. The message channel may support two-way communication between the external telephony integration part and the CRM applications and components. Messages in the message channel may be freeform, for example, with a format defined by the telephony provider. As such, the integration component may integrate the CRM system with multiple different designs of messages and corresponding message channels.

The techniques described herein may improve security of the system 100 because the message channels may be unexposed. That is, because a message channel may be secured by a unique namespace, the message channel may restrict references to the channel and may restrict usage to the components in the same namespace, protecting the message channel—and, correspondingly, messages communicated in the channel—from any other components from other namespaces. The techniques may also provide security for a bridge component between the CRM system and the telephony system, because the bridge component may be similarly unexposed, which may ensure other namespace components cannot instantiate the bridge component. Securing the bridge component may further improve the security of the message channel. Such security may help protect sensitive information communicated in a telephony system, a CRM system, or both, such as voice call recordings, customer data, CRM records, or any other sensitive communications. Further, the techniques may provide for two-way communications between the CRM system and the external telephony system. The techniques may support robust message formats and definitions because the messages may be defined by developers associated with the telephone partner companies.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

As a specific example, an integration component may use an unexposed Lightning Message Channel, Lightning Components, and a Salesforce Omni channel widget solution. Unexposed Lighting Message Channels can be defined by a Salesforce developer and may be used by Lighting Components with the same namespace in the same Lightning Application. Lightning Components may be used by customers for their Salesforce Lightning Application customization. An omni channel widget may be an example of a utility bar component which may be used in Salesforce Service Cloud products, for example, for Contact Center agent phone control.

Figure 2:
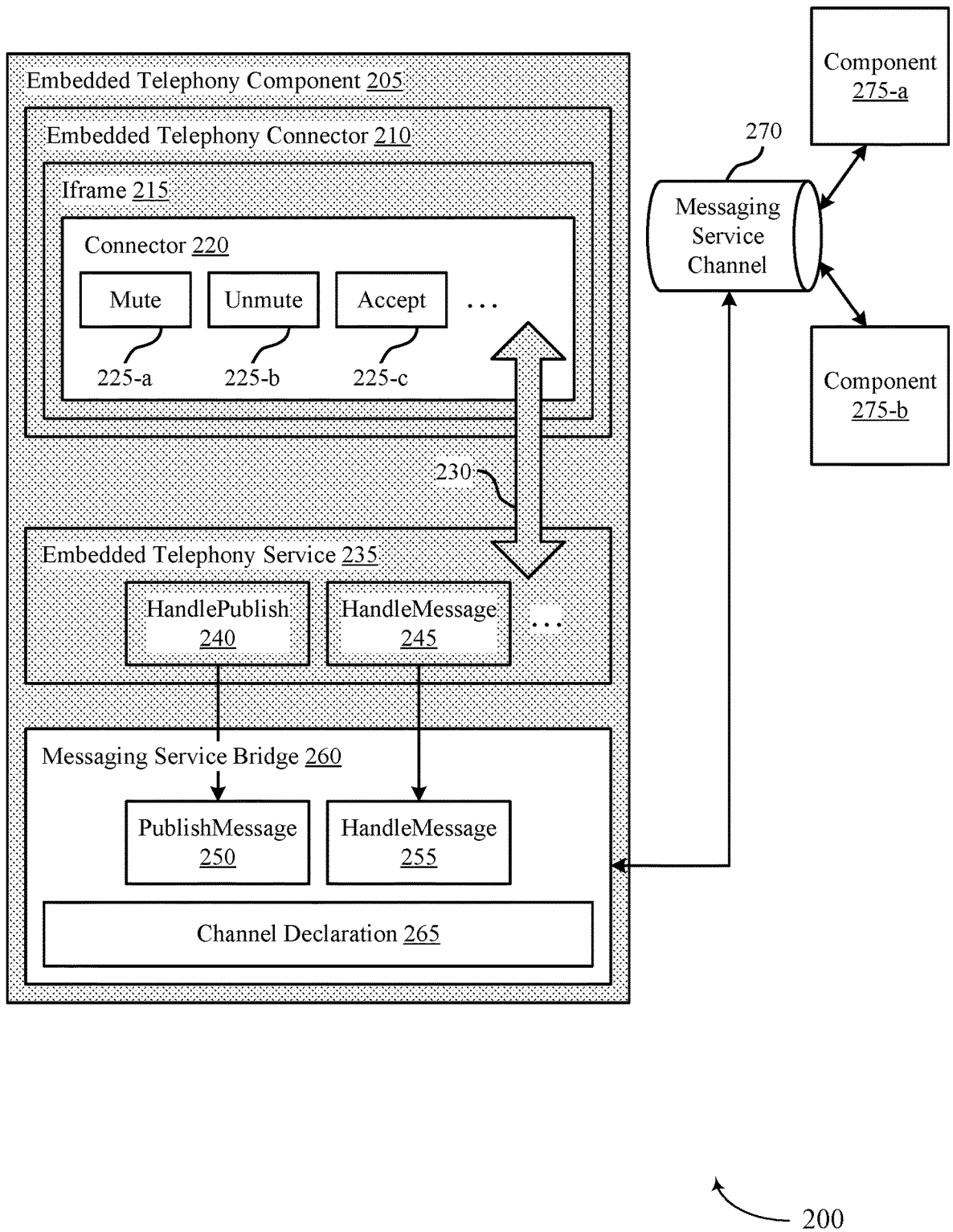
FIG. 2 illustrates an example of a system that supports secure integration between an external telephony system and a CRM system in accordance with aspects of the present disclosure.

FIG. 2 illustrates an example of a system 200 that supports secure integration between an external telephony system and a CRM system in accordance with aspects of the present disclosure. The system 200 may be implemented as part of or with a system 100. For example, the system 200 may support message handling for the system 100, which may be an example of a CRM system. In some examples, the embedded telephony component 205 may run within a CRM system to support communications with a telephony system using a messaging service channel 270, such as a Lightning Messaging Service (LMS) channel, for the telephony system. The system 200 may effectively integrate CRM information from the CRM system with telephone calls and messaging from the telephony system for a secure combined experience for agents operating an application using the system 200.

A tenant of a CRM system may subscribe to one or more external systems, such as external telephony systems, to manage one or more operations for the tenant. Users associated with the tenant, such as customer service agents or other users, may perform operations both with the CRM system and an external telephony system. For example, a customer service agent may answer a call from a customer that is routed through the telephony system, but may view CRM records to help answer questions from the customer. Additionally, the customer service agent may benefit from telephony data records (e.g., associated with previous calls from this customer) and CRM data records. The embedded telephony component 205 (e.g., an integration component or integration manager) may support the integration of the CRM system with the telephony system to improve agent experience and customer experience.

The system 200 may support a number of steps to setup the embedded telephony component 205 for operation. Some of the following steps may be optional, while other steps may be added, modified, or performed in a different order. An external telephony partner may develop an integration connector library, which may define the connector 220 and the methods 225 associated with voice call functionality for the external telephony partner supported by the connector 220. The methods may include a first method 225-*a* (e.g., mute a call), a second method 225-*b* (e.g., unmute a call), a third method 225-*c* (e.g., accept a call), or any combination of these or other methods 225 (e.g., decline a call, transfer a call, initiate a conference call, put a caller on hold). The external telephony partner may additionally define an unexposed messaging service channel 270 (e.g., a Lightning Message Channel). The messaging service channel 270 may be designated as private to ensure security of the channel. The external telephony partner may further define an unexposed component (e.g., an unexposed Lightning Component) which may reference the messaging service channel 270 and may operate in a bridge or broker role. This component (e.g., a messaging service bridge 260, which may be referred to as a bridge component) may provide component API methods for publishing and handling messages from the messaging service channel 270, for example using a publish message function 250 and a handle message function 255. The messaging service bridge 260 may reference the proper messaging service channel 270 using a channel declaration 265 within the messaging service bridge 260 (and transparent to the CRM system). The external telephony partner may deliver the messaging service channel 270, the messaging service bridge 260, and any other customized components 275 in a managed package. Examples of customized components may include Aura components 275-*a*, Lightning web components 275-*b*, or both. The external telephony partner may also indicate to the CRM system the name of the messaging service bridge 260, such that the CRM system (e.g., an embedded telephony service 235 of the CRM system) may make calls to the proper messaging service bridge 260.

Supporting such customizations at the external telephony partners may allow a telephony partner to create and distribute specific add-ons, components, or other functionality that may grant the telephony partner a competitive advantage over other telephony partners. Additionally, based on the security of the system, such add-ons, components, or other functionality may be hidden from other telephony partners and the CRM system.

If the CRM system is loading the embedded telephony component 205 (e.g., loading an Omni channel widget), the CRM system may read the bridge component name and render the bridge component (e.g., the messaging service bridge 260) within the embedded telephony component 205, along with the external telephony integration connector (e.g., the connector 220) in an iframe 215. Using the connector 220, the CRM system may post a message across the iframe 215 (e.g., using a browser-supported message channel, such as the message channel 230), and the CRM system may handle the message and, in some cases, may call a bridge component API method accordingly (e.g., a publish message function 250 or a handle message function 255). The message channel 230 may also be an example of an unexposed message channel within the CRM system. The message channel 230 may communicate messages or other information between the iframe 215 and the embedded telephony service 235, which may include a handle publish function 240 supporting calls to the publish message function 250 and a handle message function 245 supporting calls to the handle message function 255. In some cases, the embedded telephony service 235 may support one or more additional functions that may support operations within the CRM system, such as data manipulation operations, data record creation operations, or any other operations. In some examples, the messaging service bridge 260 may handle one or more messages from the messaging service channel 270, the message channel 230 (e.g., via the embedded telephony service 235), or both. The CRM system may post one or more messages to the connector 220 within the iframe 215 via the message channel 230. In some examples, the iframe 215 may be loaded within an embedded telephony connector 210 of the embedded telephony component 205 (e.g., the integration component).

In some cases, the embedded telephony component 205 may be configured to enable telephone partner companies (e.g., Cisco) to develop value-added components and features using a secure or unexposed message channel (e.g., a messaging service channel 270). For example, the unexposed channel may be a Lightning Message Channel (LMC), and a Lightning Message Service (LMS) may be used to communicate over the LMC. The LMS may be used to enable communication between Visualforce and Lightning Components on a Lightning Page. LMS may provide an API to publish messages throughout Lightning Experience and subscribe to messages that originated from anywhere within Lightning Experience. Visualforce, Lightning Components, and Lightning Pages are specific examples of applications, components, and pages that may be used to support an embedded telephony component 205, although many other applications, components, and pages may be used. LMS may be an example of a front-end service that works in client-side user interfaces, which may include popped out utility bar item windows and parent/child iframe windows. Interactions may originate from the same Lightning Experience application instance (e.g., a same browser tab).

In some examples, a telephone partner company may define an unexposed LMS channel (e.g., a messaging service channel 270) and may deliver the channel to one or more customers via a managed package. The telephone partner company may use a connector JavaScript (JS) in a static resource and loaded via a Visualforce page. The telephone partner company may additionally or alternatively develop and deliver custom components 275 in the managed package, the custom components 275 and the connector JS supporting communications using the messaging service channel 270.

For example, the telephone partner company may develop a message channel using the Salesforce LMS for communication between external telephony integration parts and internal CRM applications and components. The message channel (e.g., the messaging service channel 270) may be secured by the external telephony provider's namespace, which may restrict access to the message channel to applications and components with the same namespace. The message channel may support two-way communication between external telephony integration parts and internal CRM components (e.g., Salesforce Lightning Applications and Components). The messages in the message channel (e.g., the messaging service channel 270, which may be handled by methods or other functions in the embedded telephony component 205) may be freeform and defined by the telephony provider.

Figure 3:
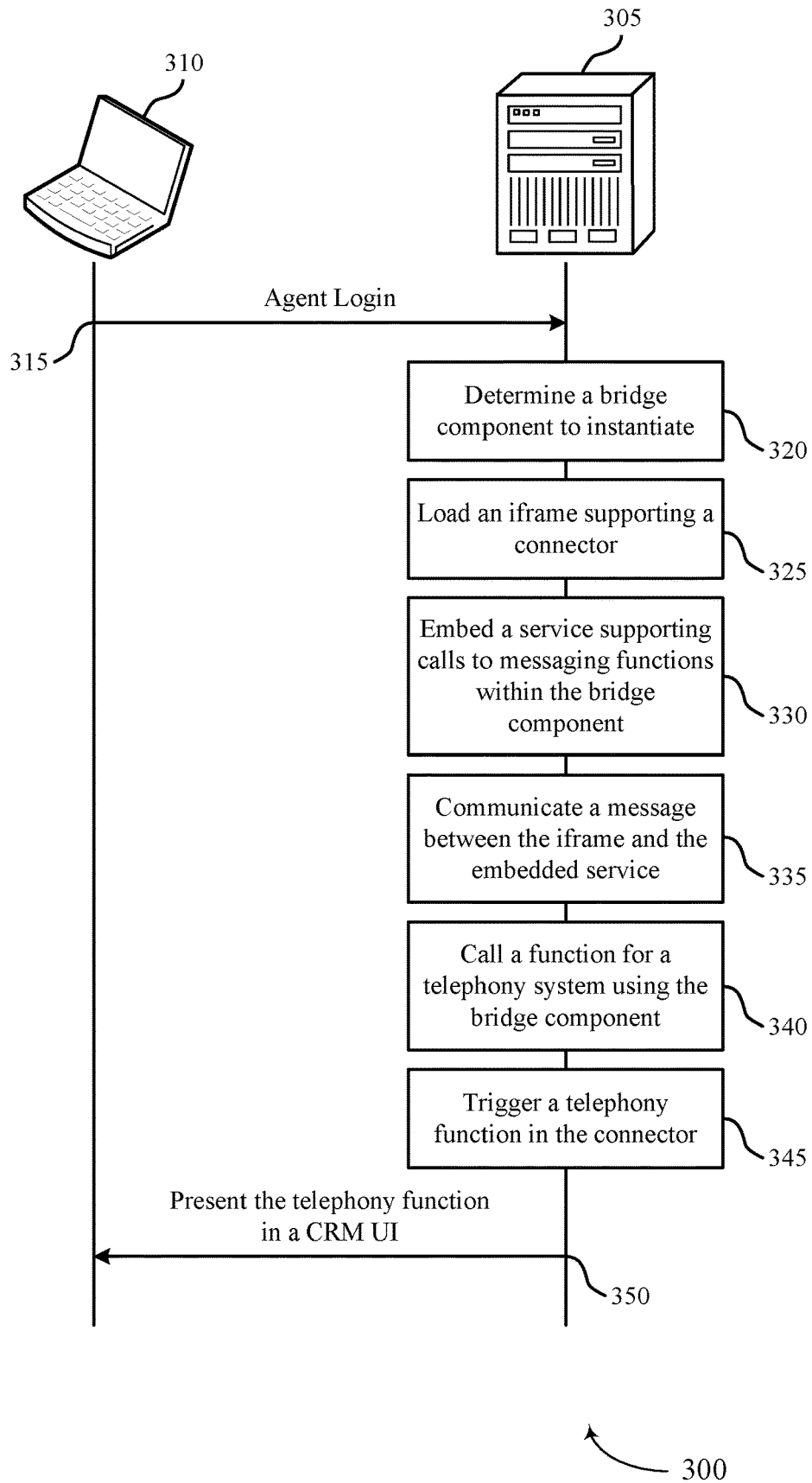
FIG. 3 illustrates an example of a process flow that supports secure integration between an external telephony system and a CRM system in accordance with aspects of the present disclosure.

FIG. 3 illustrates an example of a process flow 300 that supports secure integration between an external telephony system and a CRM system in accordance with aspects of the present disclosure. The process flow 300 may be implemented by a system including one or more processing devices 305 and a user device 310. A processing device 305 (e.g., a server, application server, worker server, database server, server cluster, virtual machine, container, or a combination thereof) may host a component supporting an integration between an external telephony system and a CRM system. In some examples, the processing device 305 may host the component within the CRM system, and the component may support a bridge to the external telephony system. A company or organization using the CRM system (e.g., a tenant of a multi-tenant database system supporting CRM solutions) may use the telephony system for managing voice calls, amongst other messaging processes. The user device 310 may be operated by an agent (e.g., a user) of the organization. For example, the agent may be a customer service agent handling customer service solutions for the organization. The agent may use both CRM records from the CRM system and communication technologies from the telephony system. Alternative examples of the following may be implemented, where some processes are performed in a different order than described or are not performed at all. In some examples, processes may include additional features not mentioned below, or further processes may be added.

At 315, the user of the user device 310 (e.g., a customer service agent for an organization) may log into a CRM system. In some examples, the processing device 305 may host an application for the CRM system, and the user of the user device 310 may log into the application hosted by the processing device 305. The processing device 305 may receive, from the user device 310, agent login information corresponding to the user operating the user device 310. For example, the agent login information may include a username, a tenant identifier (ID) corresponding to the agent, role information for the agent, location information for the agent, or a combination thereof.

The processing device 305 may load and host a component (e.g., an integration manager) for integrating the CRM system with a telephony system. For example, the processing device 305 may connect the agent logging into the CRM system with a specific telephony system. In some examples, the processing device 305 may determine the telephony system for connecting the agent based on the agent login information (e.g., the tenant to which the agent belongs, the location of the agent, the role of the agent). For example, a tenant (e.g., a company or organization) may use multiple telephony systems, such as different telephony systems in different geographic regions, for different user roles, or the like.

At 320, the processing device 305 may determine a bridge component to instantiate in the component. The processing device 305 may determine the bridge component based on the telephony system selected for the agent's connection. In some examples, the processing device 305 may access metadata associated with the telephony system and may determine, from multiple supported bridge components, the specific bridge component to instantiate based on reading the metadata for the telephony system. The processing device 305 may instantiate the bridge component within the component (e.g., the integration manager, which may be referred to as an integration component). The bridge component may support a bridge between the CRM system and the telephony system for a set of messaging functions.

At 325, the processing device 305 may load, in the integration component, an iframe supporting a connector to the telephony system external to the CRM system. The processing device 305 may call a URL within the iframe to load the connector. In a first example, the URL may correspond to a page hosted within the CRM system. In a second example, the URL may correspond to a third-party URL (e.g., a URL hosted by a device at the telephony system). Accordingly, the connector may be hosted by the processing device 305 (e.g., within the CRM system) or may be hosted by a different processing device (e.g., within the telephony system). The connector may support multiple methods associated with voice call functionality of the telephony system. For example, the connector may support accepting a call, rejecting a call, muting a call, unmuting a call, putting a call on speaker mode, or any other voice call events that may occur for the telephony system. The connector may allow the agent to perform such voice call events within an application hosted in the CRM system. In this way, the agent may use a user interface of the user device 310 displaying a CRM application to handle voice calls running through the telephony system.

At 330, the processing device 305 may embed a service within the integration component. The embedded service may support calls to one or more messaging functions defined for the instantiated bridge component. For example, the bridge component may include a set of messaging functions as known endpoints, such that the embedded service may call the messaging functions despite the functionality and underlying code for the messaging functions being hidden from the CRM system. That is, the telephony system may develop the bridge component, and the CRM system may determine which bridge component to instantiate and may support ways to call the messaging functions of the bridge component. In some examples, the messaging functions may include a publish message function and a handle message function.

The bridge component may support such messaging functions for a specific message channel of the telephony system. For example, the bridge component may declare a message channel (e.g., transparent to the CRM system), and the bridge component may support publishing messages to the declared message channel and handling messages from the declared message channel using the defined messaging functions. In some examples, the message channel may be an example of a Lightning Message Service (LMS) channel. The processing device 305 may access, through the message channel, one or more components (e.g., Aura components, Lightning Web Components, or other components) defined for the telephony system which share a namespace with the message channel. For example, the message channel, the components, the bridge component, the connector, or a combination thereof may correspond to a same unique namespace within the CRM system. To use the telephony system, the organization (e.g., tenant) within the CRM system may download—or otherwise access—a managed package developed by the telephony system (e.g., the telephony vendor) and corresponding to the unique namespace. The managed package may define a latest version of the message channel, the components that may connect with the message channel, the bridge component, the connector, or a combination thereof.

At 335, the processing device 305 may communicate a message between the iframe and the embedded service. For example, the integration component may include a secure (e.g., unexposed) message channel between the iframe and the embedded service. This secure message channel may support the communication of information between the connector to the telephony system and methods at the CRM system, such that call information from the connector may be sent to the CRM system for recordation, and records from the CRM system may be used for events occurring in the telephony system.

At 340, the processing device 305 may call a function for the telephony system using the bridge component. The function may be defined within the instantiated bridge component, and the embedded service may include CRM functions for calling the functions within the bridge component. For example, the processing device 305 may call a publish function, a handle message function, or both supported by the bridge component. If a publish function is called, the processing device 305 may send a message for publishing in the telephony system (e.g., in the message channel declared within the bridge component). If a handle message function is called, the processing device 305 may receive a message from the telephony system (e.g., from the message channel declared within the bridge component). In some cases, the bridge component may trigger the handle message function based on an input in the declared message channel.

At 345, the processing device 305 may trigger a telephony function in the connector. For example, the agent may receive a voice call through the telephony system. The agent may accept the call within the CRM system using the integration component and the accept call functionality supported by the connector within the iframe. In some examples, at 350, the user device 310 may present, in a user interface, an indication of the telephony function. For example, the user interface may display a CRM application. However, using the integration component, the CRM application may display—or otherwise present (e.g., via audio signals)—an indication of telephony function, such as an incoming call, within the CRM application. As such, the agent operating the user device 310 may perform telephony system operations without navigating away from the CRM application. Additionally, information captured during the call may be automatically recorded in the CRM system using the integration component. The processing device 305 may send the information for presenting in the user interface of the user device 310, for example, using the integration component hosted at the processing device 305.

Additionally or alternatively, the processing device 305 and the user device 310 may support CRM user interface communications with the telephony system. For example, the agent operating the user device 310 may enter a user input to the user interface of the user device 310, and the integration component may use the connector, the bridge component, or both to perform operations in the telephony system in response to the user input (e.g., within the CRM user interface).

Figure 4:
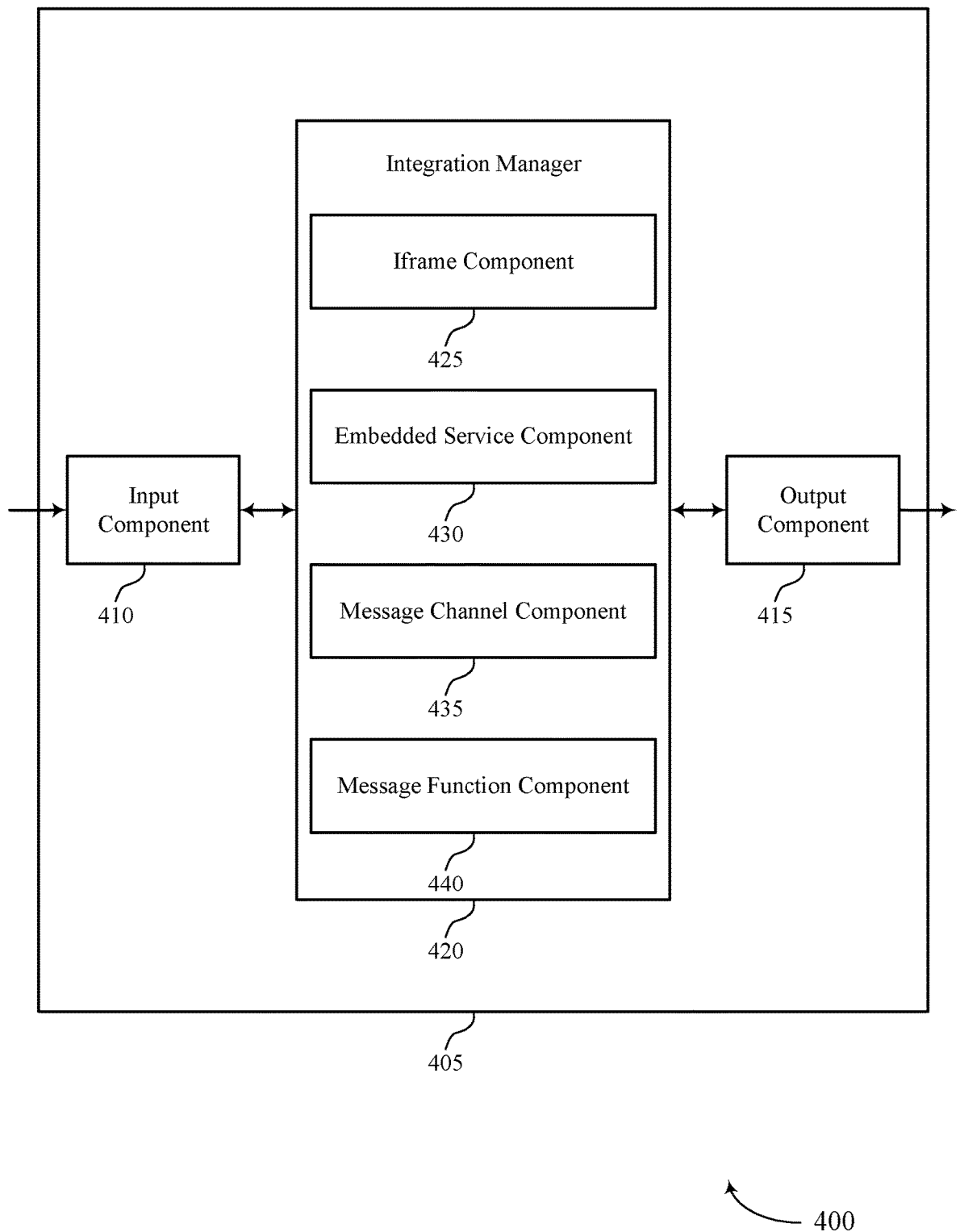
FIG. 4 shows a block diagram of an apparatus that supports secure integration between an external telephony system and a CRM system in accordance with aspects of the present disclosure.

FIG. 4 shows a block diagram 400 of a device 405 that supports secure integration between an external telephony system and a CRM system in accordance with aspects of the present disclosure. The device 405 may include an input component 410, an output component 415, and an integration manager 420. The device 405 may also include a processor. Each of these components may be in communication with one another (e.g., via one or more buses). The device 405 may be an example of a processing device, such as a user device or a server (e.g., application server, worker server, database server, server cluster, virtual machine, container), or a system including multiple processing devices.

The input component 410 may manage input signals for the device 405. For example, the input component 410 may identify input signals based on an interaction with a modem, a keyboard, a mouse, a touchscreen, or a similar device.

These input signals may be associated with user input or processing at other components or devices. In some cases, the input component 410 may utilize an operating system such as iOS®, ANDROID®, MS-DOS®, MS-WINDOWS®, OS/2®, UNIX®, LINUX®, or another known operating system to handle input signals. The input component 410 may send aspects of these input signals to other components of the device 405 for processing. For example, the input component 410 may transmit input signals to the integration manager 420 to support secure integration between an external telephony system and a CRM system. In some cases, the input component 410 may be a component of an input/output (I/O) controller 610 as described with reference to FIG. 6.

The output component 415 may manage output signals for the device 405. For example, the output component 415 may receive signals from other components of the device 405, such as the integration manager 420, and may transmit these signals to other components or devices. In some examples, the output component 415 may transmit output signals for display in a user interface, for storage in a database or data store, for further processing at a server or server cluster, or for any other processes at any number of devices or systems. In some cases, the output component 415 may be a component of an I/O controller 610 as described with reference to FIG. 6.

For example, the integration manager 420 may include an iframe component 425, an embedded service component 430, a message channel component 435, a message function component 440, or any combination thereof. In some examples, the integration manager 420, or various components thereof, may be configured to perform various operations (e.g., receiving, monitoring, transmitting) using or otherwise in cooperation with the input component 410, the output component 415, or both. For example, the integration manager 420 may receive information from the input component 410, send information to the output component 415, or be integrated in combination with the input component 410, the output component 415, or both to receive information, transmit information, or perform various other operations as described herein.

The integration manager 420 may support message processing in accordance with examples as disclosed herein. The iframe component 425 may be configured as or otherwise support a means for loading, for a first component of a first system (e.g., a CRM system), an inline frame supporting a connector to a second system (e.g., a telephony system) external to the first system. The embedded service component 430 may be configured as or otherwise support a means for embedding a service within the first component, the embedded service supporting calls to one or more messaging functions defined for a bridge component with the second system. The message channel component 435 may be configured as or otherwise support a means for communicating a message between the inline frame and the embedded service using an unexposed message channel. The message function component 440 may be configured as or otherwise support a means for calling a function of the one or more messaging functions defined for the bridge component using the embedded service. For example, the message function component 440 may be configured as or otherwise support a means for calling a publish function to send the message for publishing in the second system.

Figure 5:
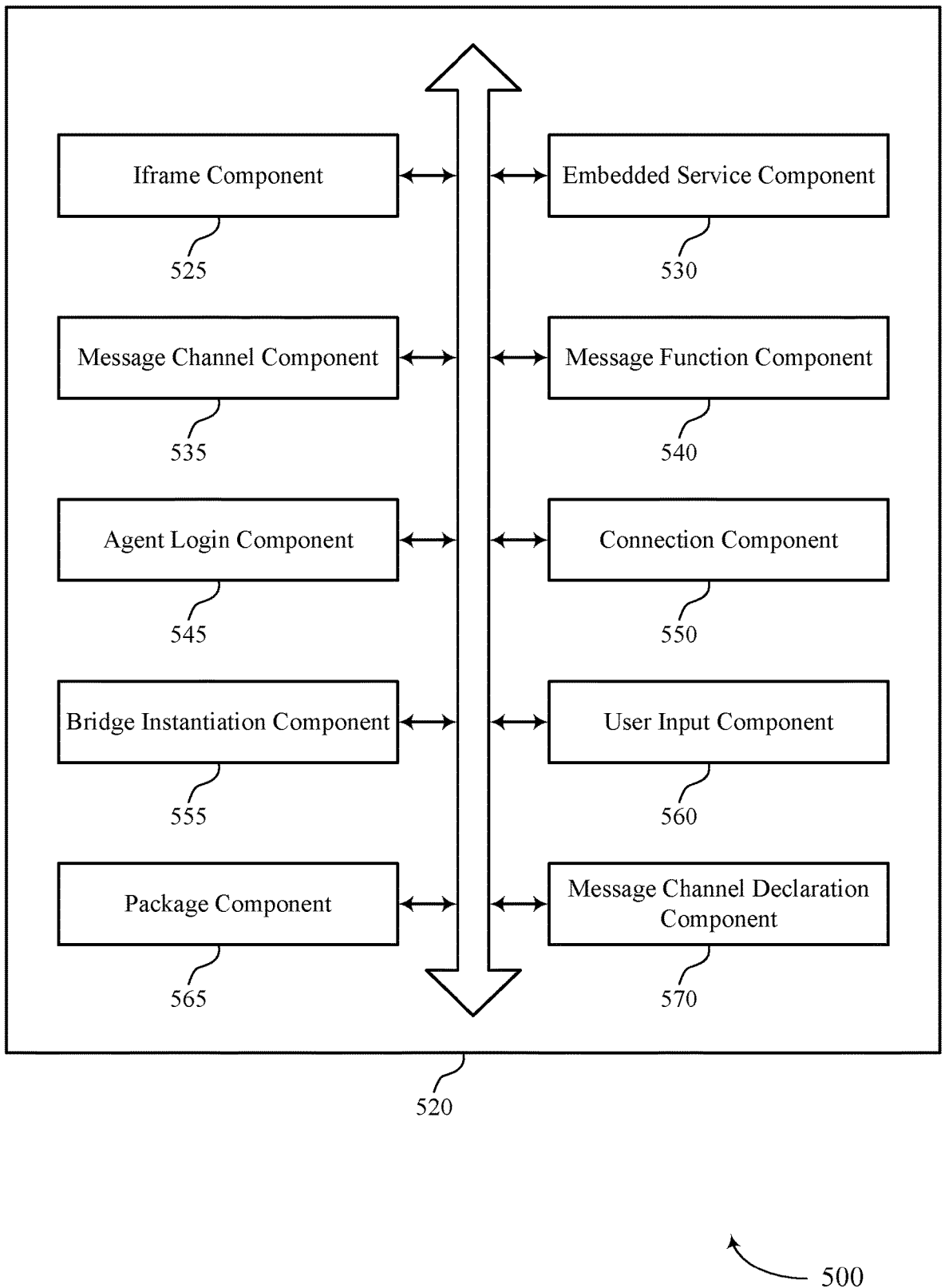
FIG. 5 shows a block diagram of an integration manager that supports secure integration between an external telephony system and a CRM system in accordance with aspects of the present disclosure.

FIG. 5 shows a block diagram 500 of an integration manager 520 that supports secure integration between an external telephony system and a CRM system in accordance with aspects of the present disclosure. The integration manager 520 may be an example of aspects of an integration manager 420, as described herein. In some examples, the integration manager 520 may be an example of a processing device or system that may load and host a first component (e.g., an integration component) for interfacing between a CRM system and a telephony system. The integration manager 520, or various components thereof, may be an example of means for performing various aspects of secure integration between an external telephony system and a CRM system as described herein. For example, the integration manager 520 may include an iframe component 525, an embedded service component 530, a message channel component 535, a message function component 540, an agent login component 545, a connection component 550, a bridge instantiation component 555, a user input component 560, a package component 565, a message channel declaration component 570, or any combination thereof. Each of these components may communicate, directly or indirectly, with one another (e.g., via one or more buses).

The integration manager 520 may support message processing in accordance with examples as disclosed herein. The iframe component 525 may be configured as or otherwise support a means for loading, for a first component of a first system, an inline frame supporting a connector to a second system external to the first system. The embedded service component 530 may be configured as or otherwise support a means for embedding a service within the first component, the embedded service supporting calls to one or more messaging functions defined for a bridge component with the second system. The message channel component 535 may be configured as or otherwise support a means for communicating a message between the inline frame and the embedded service using an unexposed message channel. The message function component 540 may be configured as or otherwise support a means for calling a publish function of the one or more messaging functions defined for the bridge component using the embedded service to send the message for publishing in the second system.

In some examples, the agent login component 545 may be configured as or otherwise support a means for receiving, from a user device, agent login information corresponding to a user operating the user device. In some examples, the connection component 550 may be configured as or otherwise support a means for determining the second system for a connection with the user device based on the agent login information. In some examples, the bridge instantiation component 555 may be configured as or otherwise support a means for instantiating the bridge component based on the determined second system.

In some examples, the bridge instantiation component 555 may be configured as or otherwise support a means for accessing metadata associated with the second system based on the determined second system. In some examples, the bridge instantiation component 555 may be configured as or otherwise support a means for determining, from a set of multiple bridge components, the bridge component to instantiate based on the metadata, where the instantiating is based on the determined bridge component.

In some examples, the agent login component 545 may be configured as or otherwise support a means for loading the first component in response to the agent login information. In some examples, the message function component 540 may be configured as or otherwise support a means for sending, for display in a user interface of the user device, information associated with the message based on calling the publish function.

In some examples, the message function component 540 may be configured as or otherwise support a means for calling a handle message function of the one or more messaging functions defined for the bridge component using the embedded service to receive a second message from the second system.

In some examples, the user input component 560 may be configured as or otherwise support a means for receiving, from a user device, a user input in a user interface of the user device. In some examples, the message function component 540 may be configured as or otherwise support a means for calling a function of the one or more messaging functions defined for the bridge component using the embedded service in response to the user input.

In some examples, the iframe component 525 may be configured as or otherwise support a means for calling a URL within the inline frame to load the connector to the second system, where the connector includes a set of multiple methods associated with voice call functionality of the second system. In some examples, the iframe component 525 may be configured as or otherwise support a means for sending, for display in a user interface of a user device based on the inline frame, an indication of a voice call event based on a voice call handled by the second system and a method of the set of multiple methods associated with the voice call functionality.

In some examples, the connection component 550 may be configured as or otherwise support a means for determining a user device connects with a third system external to the first system, where the third system is different from the second system. In some examples, the iframe component 525 may be configured as or otherwise support a means for loading a second inline frame supporting a second connector to the third system. In some examples, the bridge instantiation component 555 may be configured as or otherwise support a means for instantiating a second bridge component, where the embedded service supports additional calls to one or more second messaging functions defined for the second bridge component with the third system. In some examples, the second system and the third system support different features, formats, APIs, protocols, or any combination thereof.

In some examples, the package component 565 may be configured as or otherwise support a means for accessing a managed package for the second system, where the bridge component, the connector, or both are defined within the managed package for the second system. In some examples, the managed package corresponds to a unique namespace within the first system. In some examples, the bridge component corresponds to the unique namespace.

In some examples, the message channel declaration component 570 may be configured as or otherwise support a means for communicating one or more messages with a message channel of the second system based on the message channel of the second system being declared within the bridge component, where the message is published in the message channel of the second system based on calling the publish function and the message channel of the second system being declared within the bridge component. In some examples, the message channel declaration component 570 may be configured as or otherwise support a means for accessing, through the message channel of the second system, one or more components defined for the second system based on the one or more components sharing a namespace with the message channel of the second system.

In some examples, the embedded service supports additional calls to one or more functions within the first system.

In some examples, the first system includes a CRM system supporting a set of multiple tenants. In some examples, the second system includes a telephony partner for a tenant of the set of multiple tenants.

Figure 6:
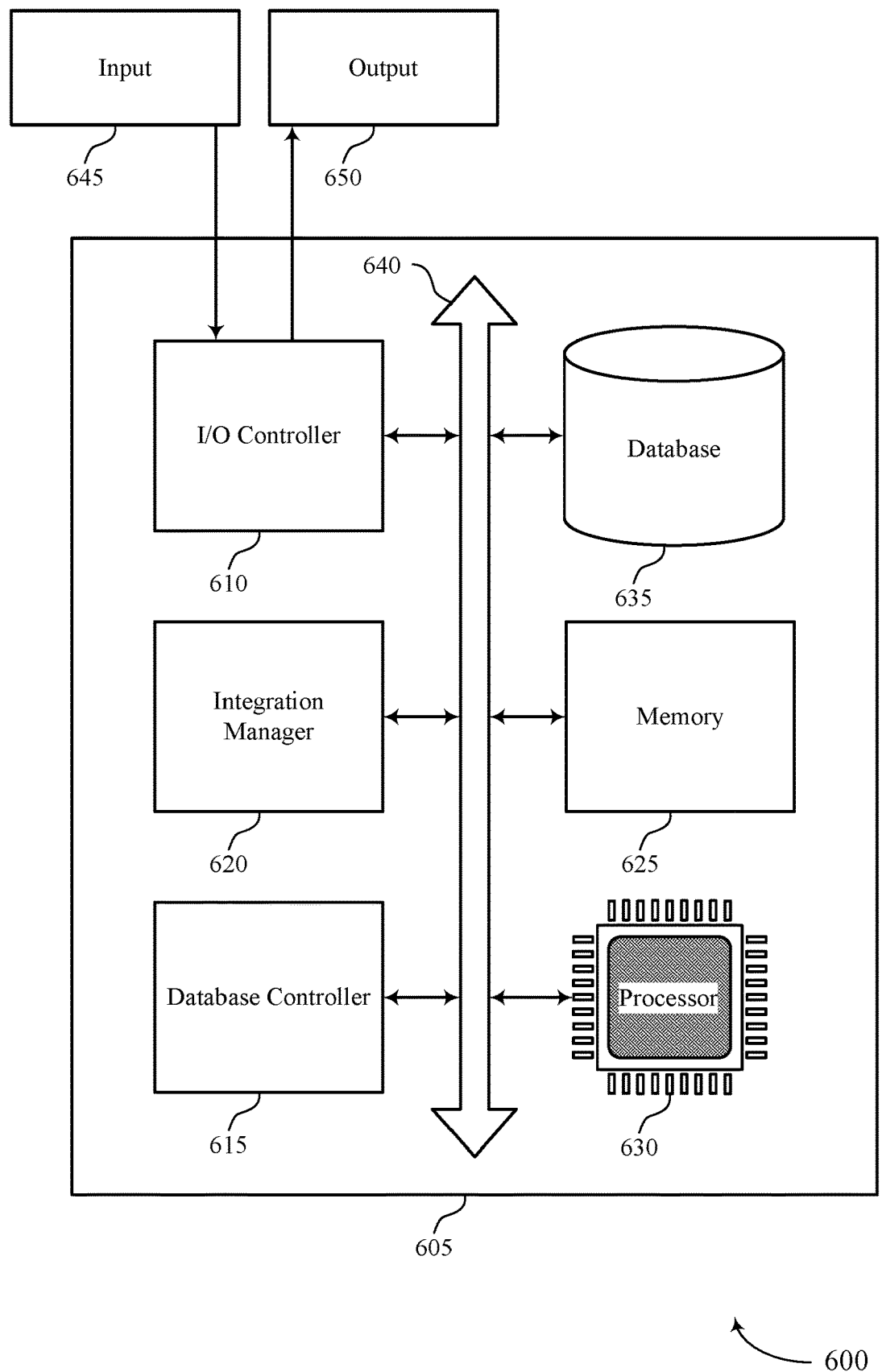
FIG. 6 shows a diagram of a system including a device that supports secure integration between an external telephony system and a CRM system in accordance with aspects of the present disclosure.

FIG. 6 shows a diagram of a system 600 including a device 605 that supports secure integration between an external telephony system and a CRM system in accordance with aspects of the present disclosure. The device 605 may be an example of or include the components of a device 405 as described herein, such as a processing device or system. The device 605 may include components for bi-directional data communications including components for transmitting and receiving communications, such as an integration manager 620, an I/O controller 610, a database controller 615, a memory 625, a processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and read-only memory (ROM). The memory 625 may store computer-readable, computer-executable software including instructions that, when executed, cause the processor 630 to perform various functions described herein. In some cases, the memory 625 may contain, among other things, a basic I/O system (BIOS) which may control basic hardware or software operation such as the interaction with peripheral components or devices.

The processor 630 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting secure integration between an external telephony system and a CRM system).

The integration manager 620 may support message processing in accordance with examples as disclosed herein. For example, the integration manager 620 may be configured as or otherwise support a means for loading, for a first component of a first system, an inline frame supporting a connector to a second system external to the first system. The integration manager 620 may be configured as or otherwise support a means for embedding a service within the first component, the embedded service supporting calls to one or more messaging functions defined for a bridge component with the second system. The integration manager 620 may be configured as or otherwise support a means for communicating a message between the inline frame and the embedded service using an unexposed message channel. The integration manager 620 may be configured as or otherwise support a means for calling a publish function of the one or more messaging functions defined for the bridge component using the embedded service to send the message for publishing in the second system.

Figure 7:
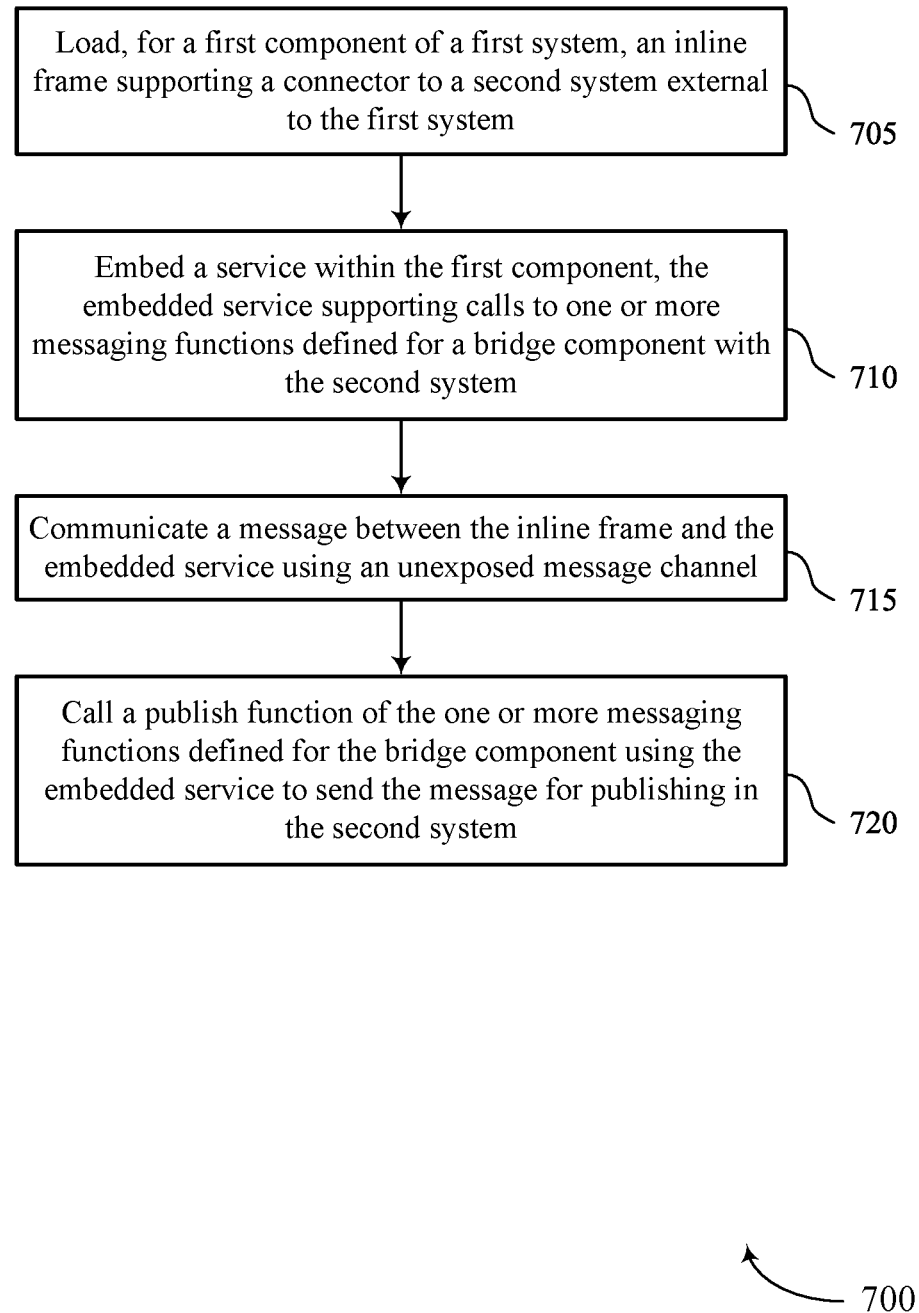
FIGS. 7 through 9 show flowcharts illustrating methods that support secure integration between an external telephony system and a CRM system in accordance with aspects of the present disclosure.

FIG. 7 shows a flowchart illustrating a method 700 that supports secure integration between an external telephony system and a CRM system in accordance with aspects of the present disclosure. The operations of the method 700 may be implemented by a processing device or its components as described herein. For example, the operations of the method 700 may be performed by a processing device (e.g., user device, application server, worker server, database server, server cluster, virtual machine, container, or other device or system capable of hosting an integration component) as described with reference to FIGS. 1 through 6. In some examples, a processing device may execute a set of instructions to control the functional elements of the processing device to perform the described functions. Additionally, or alternatively, the processing device may perform aspects of the described functions using special-purpose hardware.

At 705, the method may include loading, for a first component of a first system, an inline frame supporting a connector to a second system external to the first system. The operations of 705 may be performed in accordance with examples as disclosed herein. In some examples, aspects of the operations of 705 may be performed by an iframe component 525 as described with reference to FIG. 5.

At 710, the method may include embedding a service within the first component, the embedded service supporting calls to one or more messaging functions defined for a bridge component with the second system. The operations of 710 may be performed in accordance with examples as disclosed herein. In some examples, aspects of the operations of 710 may be performed by an embedded service component 530 as described with reference to FIG. 5.

At 715, the method may include communicating a message between the inline frame and the embedded service using an unexposed message channel. The operations of 715 may be performed in accordance with examples as disclosed herein. In some examples, aspects of the operations of 715 may be performed by a message channel component 535 as described with reference to FIG. 5.

At 720, the method may include calling a publish function of the one or more messaging functions defined for the bridge component using the embedded service to send the message for publishing in the second system. The operations of 720 may be performed in accordance with examples as disclosed herein. In some examples, aspects of the operations of 720 may be performed by a message function component 540 as described with reference to FIG. 5.

Figure 8:
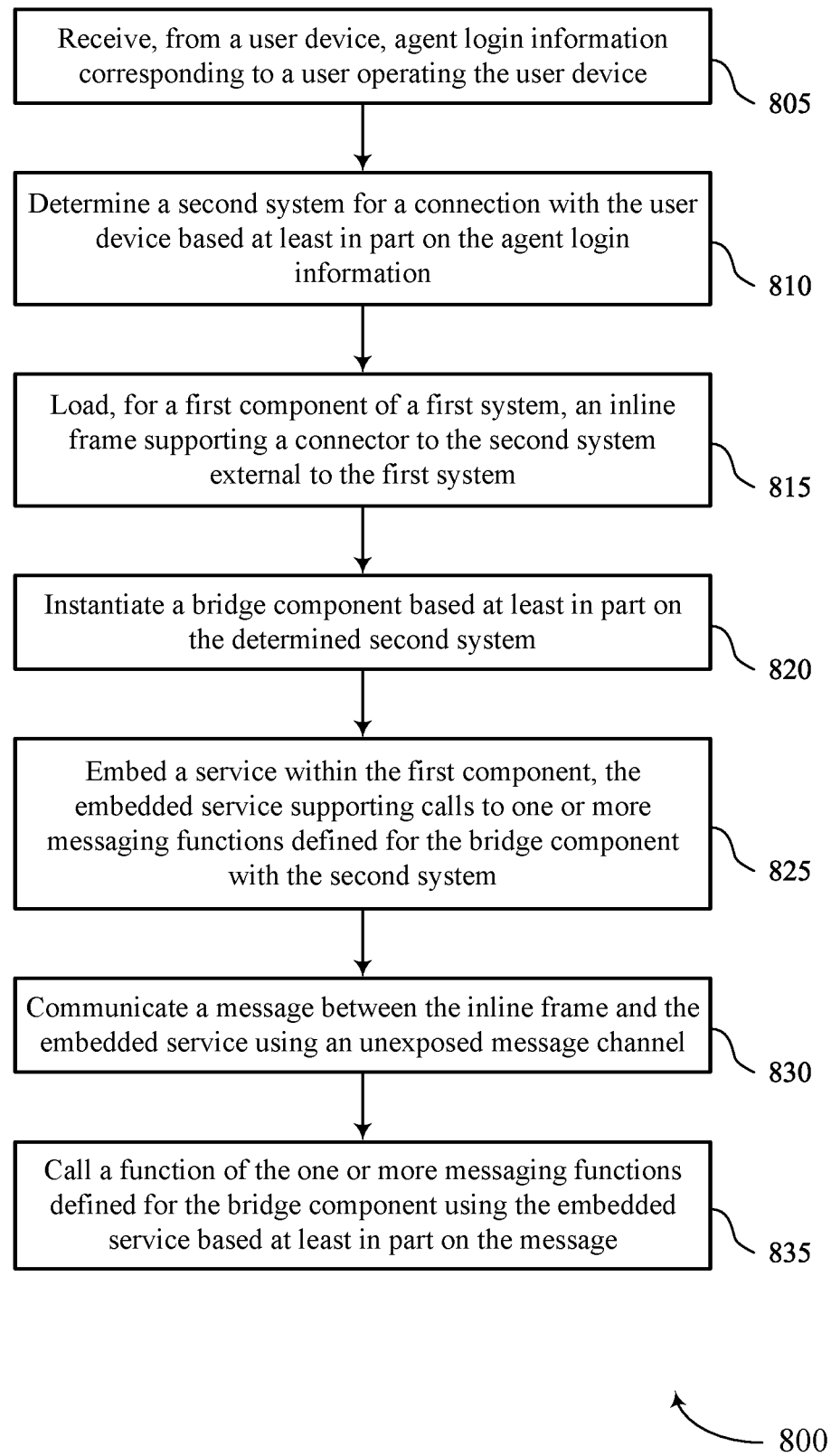

FIG. 8 shows a flowchart illustrating a method 800 that supports secure integration between an external telephony system and a CRM system in accordance with aspects of the present disclosure. The operations of the method 800 may be implemented by a processing device or its components as described herein. For example, the operations of the method 800 may be performed by a processing device as described with reference to FIGS. 1 through 6. In some examples, a processing device may execute a set of instructions to control the functional elements of the processing device to perform the described functions. Additionally, or alternatively, the processing device may perform aspects of the described functions using special-purpose hardware.

At 805, the method may include receiving, from a user device, agent login information corresponding to a user operating the user device. The operations of 805 may be performed in accordance with examples as disclosed herein. In some examples, aspects of the operations of 805 may be performed by an agent login component 545 as described with reference to FIG. 5.

At 810, the method may include determining a second system for a connection with the user device based on the agent login information. The operations of 810 may be performed in accordance with examples as disclosed herein. In some examples, aspects of the operations of 810 may be performed by a connection component 550 as described with reference to FIG. 5.

At 815, the method may include loading, for a first component of a first system, an inline frame supporting a connector to the second system external to the first system. The operations of 815 may be performed in accordance with examples as disclosed herein. In some examples, aspects of the operations of 815 may be performed by an iframe component 525 as described with reference to FIG. 5.

At 820, the method may include instantiating a bridge component based on the determined second system. The operations of 820 may be performed in accordance with examples as disclosed herein. In some examples, aspects of the operations of 820 may be performed by a bridge instantiation component 555 as described with reference to FIG. 5.

At 825, the method may include embedding a service within the first component, the embedded service supporting calls to one or more messaging functions defined for the bridge component with the second system. The operations of 825 may be performed in accordance with examples as disclosed herein. In some examples, aspects of the operations of 825 may be performed by an embedded service component 530 as described with reference to FIG. 5.

At 830, the method may include communicating a message between the inline frame and the embedded service using an unexposed message channel. The operations of 830 may be performed in accordance with examples as disclosed herein. In some examples, aspects of the operations of 830 may be performed by a message channel component 535 as described with reference to FIG. 5.

At 835, the method may include calling a function of the one or more messaging functions defined for the bridge component using the embedded service based on the message. The operations of 835 may be performed in accordance with examples as disclosed herein. In some examples, aspects of the operations of 835 may be performed by a message function component 540 as described with reference to FIG. 5.

Figure 9:
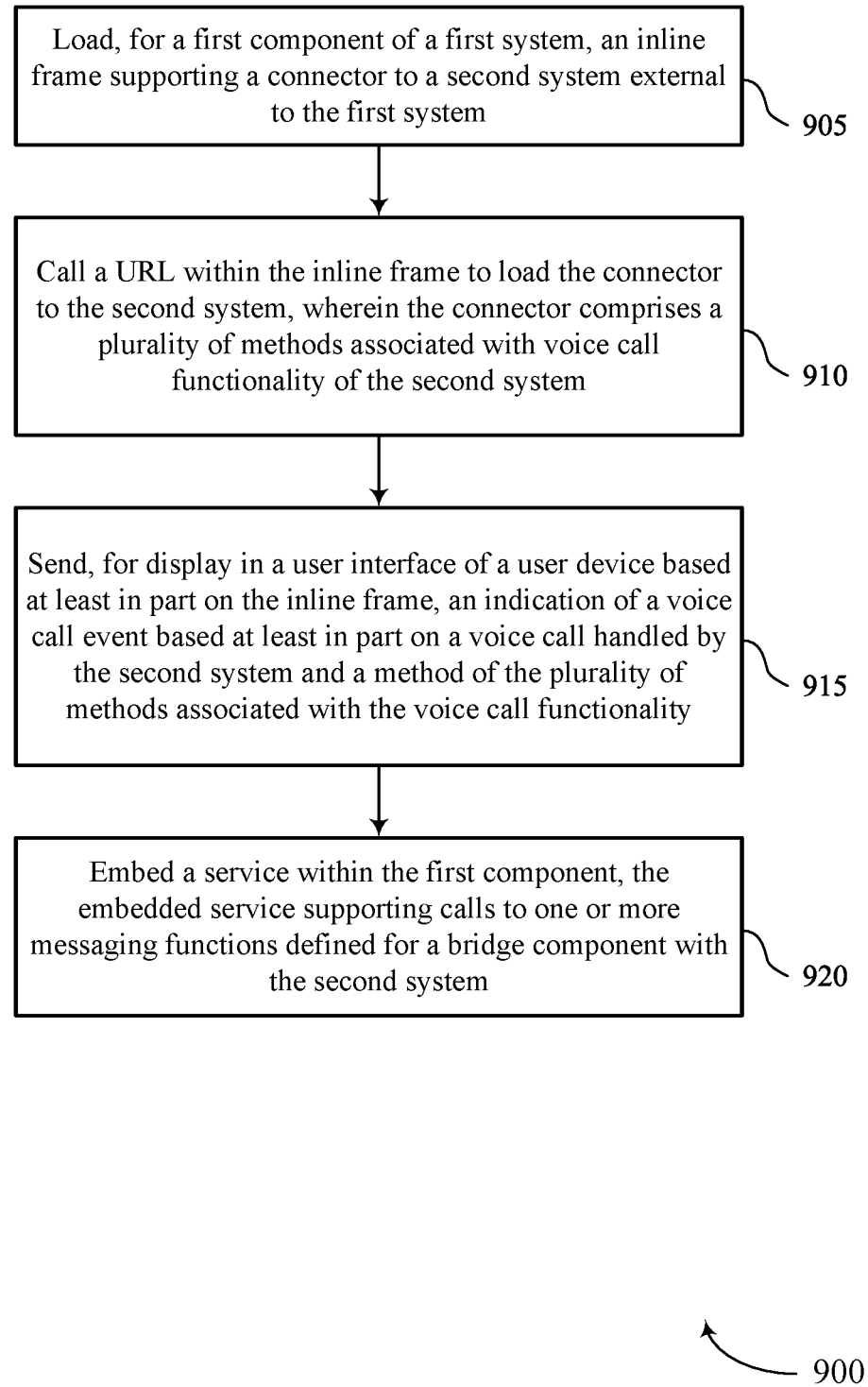

FIG. 9 shows a flowchart illustrating a method 900 that supports secure integration between an external telephony system and a CRM system in accordance with aspects of the present disclosure. The operations of the method 900 may be implemented by a processing device or its components as described herein. For example, the operations of the method 900 may be performed by a processing device as described with reference to FIGS. 1 through 6. In some examples, a processing device may execute a set of instructions to control the functional elements of the processing device to perform the described functions. Additionally, or alternatively, the processing device may perform aspects of the described functions using special-purpose hardware.

At 905, the method may include loading, for a first component of a first system, an inline frame supporting a connector to a second system external to the first system. The operations of 905 may be performed in accordance with examples as disclosed herein. In some examples, aspects of the operations of 905 may be performed by an iframe component 525 as described with reference to FIG. 5.

At 910, the method may include calling a URL within the inline frame to load the connector to the second system, where the connector includes a set of multiple methods associated with voice call functionality of the second system. The operations of 910 may be performed in accordance with examples as disclosed herein. In some examples, aspects of the operations of 910 may be performed by an iframe component 525 as described with reference to FIG. 5.

At 915, the method may include sending, for display in a user interface of a user device based on the inline frame, an indication of a voice call event based on a voice call handled by the second system and a method of the set of multiple methods associated with the voice call functionality. The operations of 915 may be performed in accordance with examples as disclosed herein. In some examples, aspects of the operations of 915 may be performed by an iframe component 525 as described with reference to FIG. 5.

At 920, the method may include embedding a service within the first component, the embedded service supporting calls to one or more messaging functions defined for a bridge component with the second system. The operations of 920 may be performed in accordance with examples as disclosed herein. In some examples, aspects of the operations of 920 may be performed by an embedded service component 530 as described with reference to FIG. 5.

A method for message processing is described. The method may include loading, for a first component of a first system, an inline frame supporting a connector to a second system external to the first system, embedding a service within the first component, the embedded service supporting calls to one or more messaging functions defined for a bridge component with the second system, communicating a message between the inline frame and the embedded service using an unexposed message channel, and calling a publish function of the one or more messaging functions defined for the bridge component using the embedded service to send the message for publishing in the second system.

An apparatus for message processing is described. The apparatus may include a processor, memory coupled with the processor, and instructions stored in the memory. The instructions may be executable by the processor to cause the apparatus to load, for a first component of a first system, an inline frame supporting a connector to a second system external to the first system, embed a service within the first component, the embedded service supporting calls to one or more messaging functions defined for a bridge component with the second system, communicate a message between the inline frame and the embedded service using an unexposed message channel, and call a publish function of the one or more messaging functions defined for the bridge component using the embedded service to send the message for publishing in the second system.

Another apparatus for message processing is described. The apparatus may include means for loading, for a first component of a first system, an inline frame supporting a connector to a second system external to the first system, means for embedding a service within the first component, the embedded service supporting calls to one or more messaging functions defined for a bridge component with the second system, means for communicating a message between the inline frame and the embedded service using an unexposed message channel, and means for calling a publish function of the one or more messaging functions defined for the bridge component using the embedded service to send the message for publishing in the second system.

A non-transitory computer-readable medium storing code for message processing is described. The code may include instructions executable by a processor to load, for a first component of a first system, an inline frame supporting a connector to a second system external to the first system, embed a service within the first component, the embedded service supporting calls to one or more messaging functions defined for a bridge component with the second system, communicate a message between the inline frame and the embedded service using an unexposed message channel, and call a publish function of the one or more messaging functions defined for the bridge component using the embedded service to send the message for publishing in the second system.

Some examples of the method, apparatuses, and non-transitory computer-readable medium described herein may further include operations, features, means, or instructions for receiving, from a user device, agent login information corresponding to a user operating the user device, determining the second system for a connection with the user device based on the agent login information, and instantiating the bridge component based on the determined second system.

Some examples of the method, apparatuses, and non-transitory computer-readable medium described herein may further include operations, features, means, or instructions for accessing metadata associated with the second system based on the determined second system and determining, from a set of multiple bridge components, the bridge component to instantiate based on the metadata, where the instantiating may be based on the determined bridge component.

Some examples of the method, apparatuses, and non-transitory computer-readable medium described herein may further include operations, features, means, or instructions for loading the first component in response to the agent login information.

Some examples of the method, apparatuses, and non-transitory computer-readable medium described herein may further include operations, features, means, or instructions for sending, for display in a user interface of the user device, information associated with the message based on calling the publish function.

Some examples of the method, apparatuses, and non-transitory computer-readable medium described herein may further include operations, features, means, or instructions for calling a handle message function of the one or more messaging functions defined for the bridge component using the embedded service to receive a second message from the second system.

Some examples of the method, apparatuses, and non-transitory computer-readable medium described herein may further include operations, features, means, or instructions for receiving, from a user device, a user input in a user interface of the user device and calling a function of the one or more messaging functions defined for the bridge component using the embedded service in response to the user input.

Some examples of the method, apparatuses, and non-transitory computer-readable medium described herein may further include operations, features, means, or instructions for calling a URL within the inline frame to load the connector to the second system, where the connector includes a set of multiple methods associated with voice call functionality of the second system and sending, for display in a user interface of a user device based on the inline frame, an indication of a voice call event based on a voice call handled by the second system and a method of the set of multiple methods associated with the voice call functionality.

Some examples of the method, apparatuses, and non-transitory computer-readable medium described herein may further include operations, features, means, or instructions for determining a user device connects with a third system external to the first system, where the third system may be different from the second system, loading a second inline frame supporting a second connector to the third system, and instantiating a second bridge component, where the embedded service supports additional calls to one or more second messaging functions defined for the second bridge component with the third system.

In some examples of the method, apparatuses, and non-transitory computer-readable medium described herein, the second system and the third system support different features, formats, APIs, protocols, or any combination thereof.

Some examples of the method, apparatuses, and non-transitory computer-readable medium described herein may further include operations, features, means, or instructions for accessing a managed package for the second system, where the bridge component, the connector, or both may be defined within the managed package for the second system.

In some examples of the method, apparatuses, and non-transitory computer-readable medium described herein, the managed package corresponds to a unique namespace within the first system and the bridge component corresponds to the unique namespace.

Some examples of the method, apparatuses, and non-transitory computer-readable medium described herein may further include operations, features, means, or instructions for communicating one or more messages with a message channel of the second system based on the message channel of the second system being declared within the bridge component, where the message may be published in the message channel of the second system based on calling the publish function and the message channel of the second system being declared within the bridge component.

Some examples of the method, apparatuses, and non-transitory computer-readable medium described herein may further include operations, features, means, or instructions for accessing, through the message channel of the second system, one or more components defined for the second system based on the one or more components sharing a namespace with the message channel of the second system.

In some examples of the method, apparatuses, and non-transitory computer-readable medium described herein, the embedded service supports additional calls to one or more functions within the first system.

In some examples of the method, apparatuses, and non-transitory computer-readable medium described herein, the first system includes a CRM system supporting a set of multiple tenants and the second system includes a telephony partner for a tenant of the set of multiple tenants.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for message processing, comprising:
   loading, for a first component of a first system, an inline frame supporting a connector to a second system external to the first system;
   calling a uniform resource locator (URL) within the inline frame to load the connector to the second system, wherein the connector comprises a plurality of methods associated with voice call functionality of the second system;
   embedding a service within the first component, the embedded service operating within the first system and supporting calls to one or more messaging functions defined for a bridge component based at least in part on the second system, wherein the bridge component is between the first system and the second system;
   communicating a message between the inline frame and the embedded service using an unexposed message channel, wherein the unexposed message channel is embedded within the first system and supports two-way communication between the first system and the second system;
   calling a publish function of the one or more messaging functions defined for the bridge component using the embedded service to send the message for publishing in the second system; and
   sending, for display in a user interface of a user device based at least in part on the inline frame, an indication of a voice call event based at least in part on a voice call handled by the second system and a method of the plurality of methods associated with the voice call functionality.

2. The method of claim 1, further comprising:
   receiving, from a user device, agent login information corresponding to a user operating the user device;
   determining the second system for a connection with the user device based at least in part on the agent login information; and
   instantiating the bridge component based at least in part on the determined second system.

3. The method of claim 2, further comprising:
   accessing metadata associated with the second system based at least in part on the determined second system; and
   determining, from a plurality of bridge components, the bridge component to instantiate based at least in part on the metadata, wherein the instantiating is based at least in part on the determined bridge component.

4. The method of claim 2, further comprising:
   loading the first component in response to the agent login information.

5. The method of claim 2, further comprising:
   sending, for display in a user interface of the user device, information associated with the message based at least in part on calling the publish function.

6. The method of claim 1, further comprising:
   calling a handle message function of the one or more messaging functions defined for the bridge component using the embedded service to receive a second message from the second system.

7. The method of claim 1, further comprising:
   receiving, from a user device, a user input in a user interface of the user device; and
   calling a function of the one or more messaging functions defined for the bridge component using the embedded service in response to the user input.

8. The method of claim 1, further comprising:
   determining a user device connects with a third system external to the first system, wherein the third system is different from the second system;
   loading a second inline frame supporting a second connector to the third system; and
   instantiating a second bridge component, wherein the embedded service supports additional calls to one or more second messaging functions defined for the second bridge component with the third system.

9. The method of claim 8, wherein the second system and the third system support different features, formats, application programming interfaces (APIs), protocols, or any combination thereof.

10. The method of claim 1, further comprising:
    accessing a managed package for the second system, wherein the bridge component, the connector, or both are defined within the managed package for the second system.

11. The method of claim 10, wherein:
the managed package corresponds to a unique namespace within the first system; and
the bridge component corresponds to the unique namespace.

12. The method of claim 1, further comprising:
communicating one or more messages with a message channel of the second system based at least in part on the message channel of the second system being declared within the bridge component, wherein the message is published in the message channel of the second system based at least in part on calling the publish function and the message channel of the second system being declared within the bridge component.

13. The method of claim 12, further comprising:
accessing, through the message channel of the second system, one or more components defined for the second system based at least in part on the one or more components sharing a namespace with the message channel of the second system.

14. The method of claim 1, wherein the embedded service supports additional calls to one or more functions within the first system.

15. The method of claim 1, wherein:
the first system comprises a customer relationship management (CRM) system supporting a plurality of tenants; and
the second system comprises a telephony partner for a tenant of the plurality of tenants.

16. An apparatus for message processing, comprising:
one or more processors;
one or more memories coupled with the one or more processors; and
instructions stored in the one or more memories and executable by the one or more processors to cause the apparatus to:
load, for a first component of a first system, an inline frame supporting a connector to a second system external to the first system;
call a uniform resource locator (URL) within the inline frame to load the connector to the second system, wherein the connector comprises a plurality of methods associated with voice call functionality of the second system;
embed a service within the first component, the embedded service operating within the first system and supporting calls to one or more messaging functions defined for a bridge component based at least in part on the second system, wherein the bridge component is between the first system and the second system;
communicate a message between the inline frame and the embedded service using an unexposed message channel, wherein the unexposed message channel is embedded within the first system and supports two-way communication between the first system and the second system;
call a publish function of the one or more messaging functions defined for the bridge component using the embedded service to send the message for publishing in the second system; and
send, for display in a user interface of a user device based at least in part on the inline frame, an indication of a voice call event based at least in part on a voice call handled by the second system and a method of the plurality of methods associated with the voice call functionality.

17. The apparatus of claim 16, wherein the instructions are further executable by the one or more processors to cause the apparatus to:
receive, from a user device, agent login information corresponding to a user operating the user device;
determine the second system for a connection with the user device based at least in part on the agent login information; and
instantiate the bridge component based at least in part on the determined second system.

18. The apparatus of claim 17, wherein the instructions are further executable by the one or more processors to cause the apparatus to:
access metadata associated with the second system based at least in part on the determined second system; and
determine, from a plurality of bridge components, the bridge component to instantiate based at least in part on the metadata, wherein the instantiating is based at least in part on the determined bridge component.

19. A non-transitory computer-readable medium storing code for message processing, the code comprising instructions executable by one or more processors to:
load, for a first component of a first system, an inline frame supporting a connector to a second system external to the first system;
call a uniform resource locator (URL) within the inline frame to load the connector to the second system, wherein the connector comprises a plurality of methods associated with voice call functionality of the second system;
embed a service within the first component, the embedded service operating within the first system and supporting calls to one or more messaging functions defined for a bridge component with based at least in part on the second system, wherein the bridge component is between the first system and the second system;
communicate a message between the inline frame and the embedded service using an unexposed message channel, wherein the unexposed message channel is embedded within the first system and supports two-way communication between the first system and the second system;
call a publish function of the one or more messaging functions defined for the bridge component using the embedded service to send the message for publishing in the second system; and
send, for display in a user interface of a user device based at least in part on the inline frame, an indication of a voice call event based at least in part on a voice call handled by the second system and a method of the plurality of methods associated with the voice call functionality.

* * * * *